United States Patent [19]

Guichard et al.

[11] Patent Number: 5,138,446
[45] Date of Patent: Aug. 11, 1992

[54] METHOD AND DEVICE FOR PROCESSING OF PICTURES WITH IMPROVED MOVEMENT ESTIMATION

[75] Inventors: Philippe B. Guichard, Verrieres-le-Buisson; Mohammad R. Haghiri, Sceaux, both of France

[73] Assignee: U.S. Philips Corporation, New York, N.Y.

[21] Appl. No.: 570,092

[22] Filed: Aug. 20, 1990

[30] Foreign Application Priority Data

Aug. 29, 1989 [FR] France .................... 89 11329

[51] Int. Cl.$^5$ ............................................. H04N 7/18
[52] U.S. Cl. ................................ 358/105; 358/136
[58] Field of Search ............... 358/105, 135, 136, 138, 358/140, 160

[56] References Cited

U.S. PATENT DOCUMENTS

| | | | |
|---|---|---|---|
| 4,864,394 | 9/1989 | Gillard | 358/140 |
| 4,989,087 | 1/1991 | Pele et al. | 358/136 |
| 5,031,039 | 7/1991 | Haghiri et al. | 358/105 |
| 5,055,295 | 10/1991 | Lamnabhi | 358/105 |
| 5,060,064 | 10/1991 | Lamnabhi et al. | 358/105 |
| 5,072,293 | 10/1991 | De Haan et al. | 358/105 |

Primary Examiner—James J. Groody
Assistant Examiner—Kim Yen Vu
Attorney, Agent, or Firm—Michael E. Marion

[57] ABSTRACT

In high definition or ordinary television transmission/-reception systems, and picture recording systems, for example those utilizing a laser readable disk, and in general in digital picture processing systems a picture is divided into several parts and each picture part is examined for determining thereof—in the presence of a series of pictures (20, 21, 22) succeeding each other in time—a movement vector (V). If it is desired to create intermediate pictures (23, 24) should be created between the pictures initially available, it is possible that several different vectors exist, which all yield equivalent results for certain picture parts. In order to eliminate the ambiguity, for each equivalent movement vector (16) susceptible to being utilized to create an intermediate picture (24) the position (17) is determined, in which the picture part (25) concerned would be located in a preceding picture (23) if the movement vector should be applied to this picture part, and each time the difference between a movement vector utilized to arrive at the position (17) and the movement vector which had been determined for this position in the preceding picture (23) is calculated. The movement vector chosen is then one of those for which this difference is, for example, smaller than a given threshold value.

18 Claims, 3 Drawing Sheets

|   | COST | DELTA |
|---|---|---|
| A | 4 | 3 |
| B | 4 | 11 |
| C | 4 | 21 |
| D | 10 | 10 |
| E | 13 | 10 |

FIG. 6

|   | COST | DELTA |
|---|---|---|
| A | 4 | 21 |
| B | 4 | 17 |
| C | 4 | 10 |
| D | 10 | 4 |
| E | 11 | 6 |

FIG. 7

|   | COST | DELTA |
|---|---|---|
| A | 7 | 21 |
| B | 10 | 11 |
| C | 10 | 14 |
| D | 10 | 29 |
| E | 13 | 13 |

FIG. 8

METHOD AND DEVICE FOR PROCESSING OF PICTURES WITH IMPROVED MOVEMENT ESTIMATION

BACKGROUND OF THE INVENTION

The present invention relates to a method of processing television pictures, in which the picture is divided into several parts and each picture part is examined in order to determine thereof—in the presence of a series of pictures succeeding each other in time—a movement vector.

It further relates to a device for processing pictures comprising a processor for determining—in the presence of a series of pictures succeeding each other in time—movement vectors associated with picture parts.

It finally relates to a television encoding system.

The present invention can be used in high-definition or ordinary television transmission/reception systems, in picture recording systems, for example those utilizing a laser readable disk, and in general in digital picture processing systems.

It is known from the conference entitled "Motion-compensated interpolation applied to HD-MAC pictures encoding and decoding" by F. Fonsalas and M. R. Haghiri, presented to the "Second International workshop on signal processing of HDTV", l'Aquila, Feb. 29-Mar. 3, 1988, to use such a method in a television transmission-reception system, in which complementary data of video data and especially movement vectors are transmitted by digital means designated as DATV (Digitally Assisted Television).

In the system proposed in that document, an encoding is utilized to reduce the sampling frequency with an associated flow rate of digital data reduced to the lowest possible value. For this purpose, the picture is divided into several parts, i.e. squares of 16×16 pixels, for each of which a mode of processing can be chosen among several modes, one of which utilizes movement vectors. For displaying the received pictures, the movement vectors are used to reconstruct an intermediate untransmitted picture between two transmitted pictures. In this case, the movement vectors have been determined at the encoding instant, that is to say that all the source pictures and especially those which will be suppressed by the encoding are still available, which permits of carrying out all the tests desirable for verifying the validity of the movement vectors, especially by comparing a picture reconstructed on the basis of the movement vectors with the corresponding source picture.

A particular problem arises when intermediate pictures should be formed at an instant at which the source picture by comparison is not available. This is the case, for example, when each time a supplementary picture should be introduced between two pictures for doubling the rate of display in order to diminish the flicker. When a picture has a periodical structure, for example, when it represents at least locally a raster or horizontal or vertical stripes, it is possible that several different vectors yield equivalent results for certain picture parts, that is to say that erroneous vectors can nevertheless yield correct results (no visible defects) for certain picture parts (this will be explained in detail hereinafter). However, if the chosen vector is erroneous for certain parts of the picture, while it is correct for other parts, there are visible defects at the transition between the parts which have a correct vector and those which have an erroneous vector.

It is known from the aforementioned document to use a cost function calculated over the 256 pixels of a picture part, which permits determining which is the most suitable among several movement vectors, but the estimation thus obtained does not permit eliminating the ambiguity when several movement vectors can be each used equally well for the same picture part, that is to say when several movement vectors exist, for which the aforementioned function of cost yields equivalent results. Such vectors will be designated as equivalent vectors.

SUMMARY OF THE INVENTION

The invention is based on the recognition of the fact that this problem is solved when use is made of a geometric criterion besides a cost function.

The method according to the invention is particularly characterized in that, the method of determining movement vectors being susceptible to supplying for the same picture part several equivalent movement vectors, for each equivalent movement vector the position is calculated, in which the picture part concerned would be located in a preceding picture if said movement vector should be applied to the said picture part and each time the difference is calculated between the movement vector used for arriving at said position and the movement vector which had been determined for this position in the preceding picture, the movement vector being finally chosen as a function of the result of said difference calculation.

The device according to the invention is particularly characterized in that, said processor being susceptible to supplying for the same picture part several equivalent movement vectors, the device is provided moreover with means for calculating for each equivalent movement vector the position in which the picture part concerned would be located in a preceding picture if said movement vector should be applied to this picture part, with means for calculating each time the difference between the movement vector used for arriving at said position and the movement vector which had been determined for this position in the preceding picture, and with means for selecting one movement vector (or movement vectors) from this calculated difference.

BRIEF DESCRIPTION OF THE DRAWINGS

In order that the invention may be readily carried out, it will now be described more fully, by way of example, with reference to the accompanying drawings, in which:

FIGS. 6 to 8 are tables showing examples of determining a movement vector among an assembly of equivalent movement vectors.

DETAILED DESCRIPTION OF PREFERRED EMBODIMENTS OF THE INVENTION

In the present embodiment, it is assumed that each picture is divided into picture parts, which are squares of 16×16 pixels, i.e. 256 pixels per picture part. The process begins by determining the movement for each picture part. This determination is of course based on an examination carried out at two different instants to measure the displacement which has taken place between these two instants. It can be carried out by any known method, for example a method based on differences in space and time, or utilizing techniques for carrying out Fourier transformations, or based on comparisons with application of a cost function. These three methods are described, for example, in a report of the British Broadcasting Corporation, BBC RD 1987/11, entitled: "Television motion measurement for DATV and other applications", by G. A. Thomas.

The method utilizing a cost function also described in the document mentioned in the first instance, will now be briefly described.

The movement vectors are estimated by selecting among a set of equivalent vectors that factor which minimizes a cost function given over the 256 pixels of a picture part by the following expression:

$$\sum_{x,j=1,1}^{16,16} I_0(x,y) - \frac{1}{2}(I_1(x - V_x, y - V_y) + I_1(x + V_x, y + V_y)),$$

where $I_0$ and $I_1$ are the intensities of a pixel in picture having a time index 0 and 1, respectively, for the positions indicated between brackets (according to orthogonal coordinates corresponding to the considered square), $V_x$ and $V_y$ being the orthogonal components of the considered movement vector.

After the estimation of the movement thus obtained, it is important to verify if the chosen movement vector permits obtaining the best picture. In fact, other modes of processing can be envisaged, which, as the case may be, could yield a better picture, and especially a mode in which a picture would be described more rapidly, but with a lower spatial definition. For this verification, a decoding which is the inverse of the encoding is realized in each of the envisaged modes and in each mode the decoded picture part and the source picture part are compared in order to determine which is the mode yielding the best picture for the part concerned (instantaneously all the source pictures are available).

Let it now be assumed that the superiority of the mode with a movement vector has been ascertained for a given square. It is then not considered to use another mode.

Figure 1:
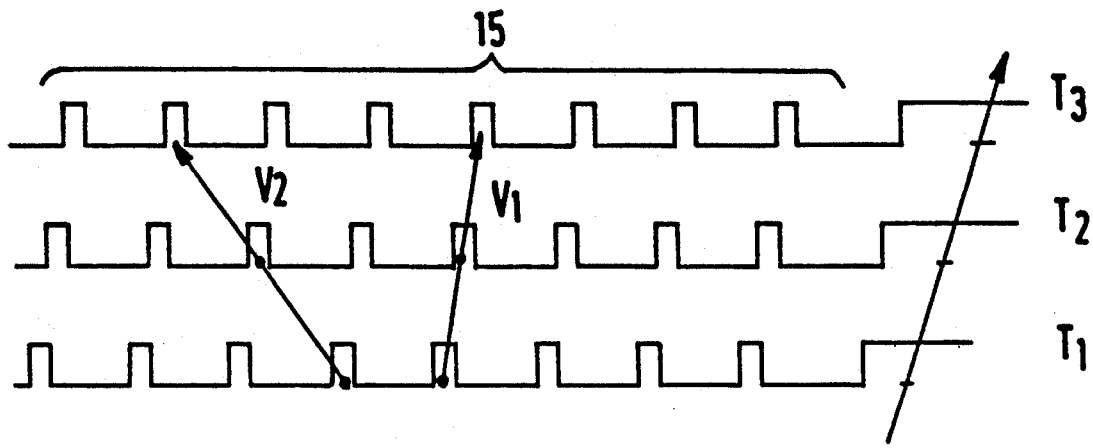
FIGS. 1 to 3 show video signals to explain the problem solved by the invention.
Figure 2:
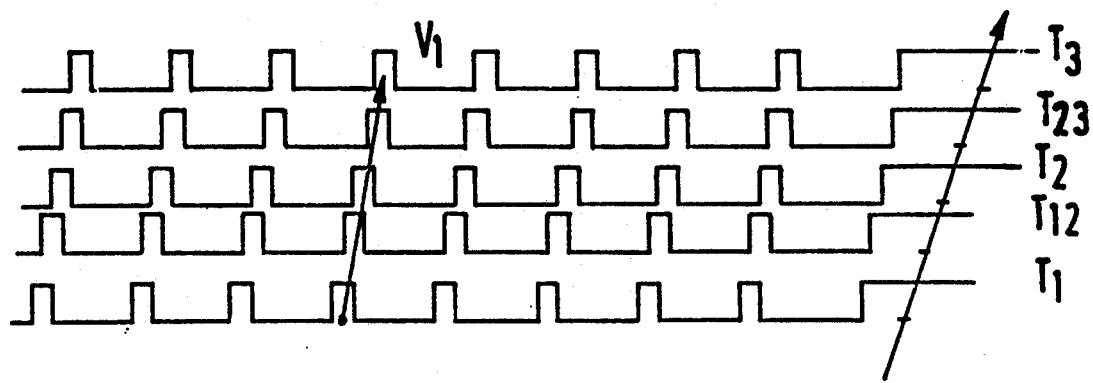
Figure 3:
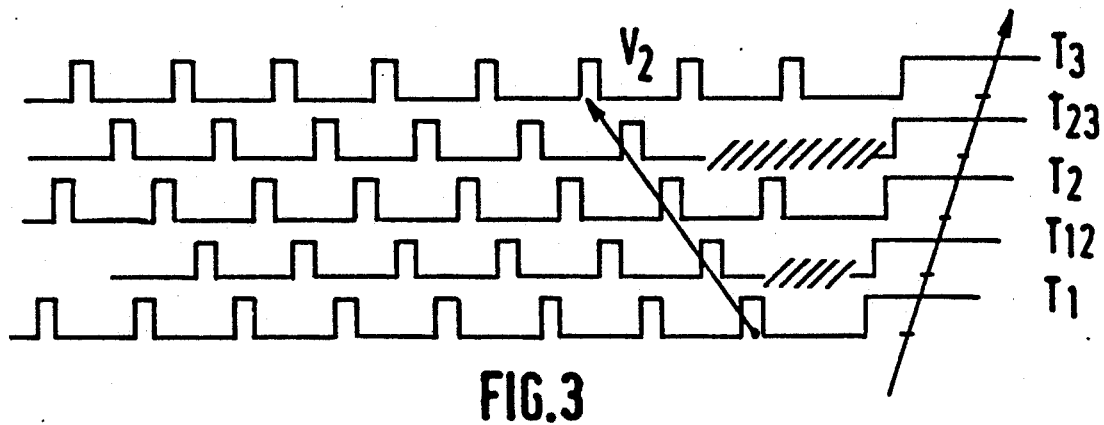

Video signals are represented in FIG. 1 at the instants indicated by T1, T2, T3. These signals correspond, for example, at 15 to the picture of a bright vertical raster (as a positive modulation), a bright part of larger size being shown in the righthand part of the Figure, whose right hand boundary is not shown. If the method explained above is used for these signals, it is found that for the picture of the raster there are two vectors $V_1$ and $V_2$, which are equivalent (they give the same value for the cost function and moreover they would also yield the same result during the verification of the best mode). Let it be assumed that intermediate pictures are created to diminish the visual impression of flicker from these successive pictures at the instants T1, T2, T3. The pictures recreated from the vector $V_1$ are shown in FIG. 2 and those recreated from the vector $V_2$ are shown in FIG. 3. The time instant between T1 and T2 is designated by T12 and the time instant between T2 and T3 is designated by T23. In FIG. 2, the intermediate pictures T12 and T23 are correct. In FIG. 3, there are zones indicated by cross-hatched lines at 45° where there is uncertainty: It is clear that an automatic process is ineffective for eliminating the information hiatuses.

Figure 4:
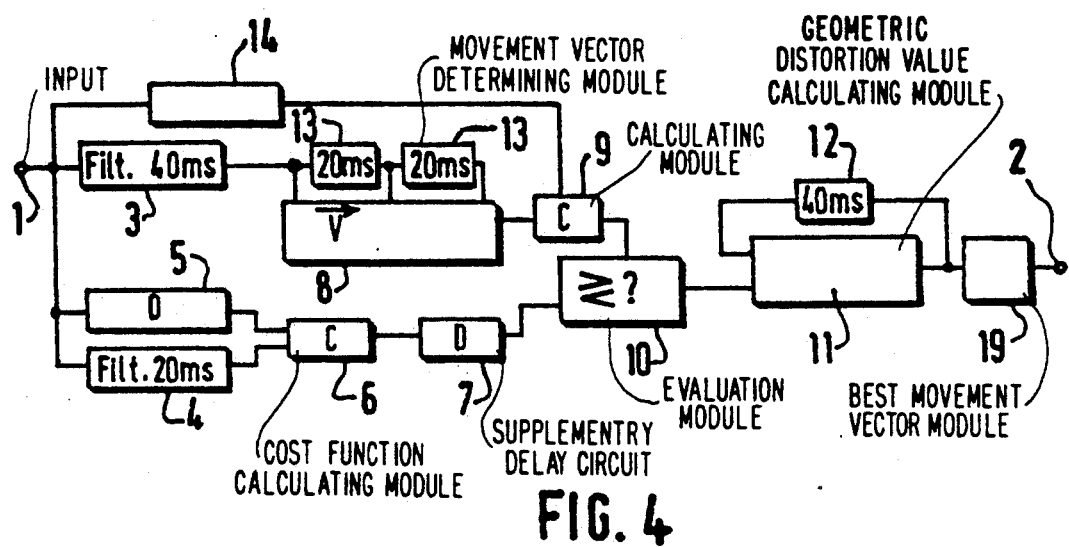
FIG. 4 shows diagrammatically a device in which the method of the invention is carried out.

In the encoding device of FIG. 4, pictures to be encoded are introduced at 1. They can then be applied to two different paths:

The path shown in the upper part of the Figure is intended for an encoding with estimation of movement vectors, in which a complete picture is described in 40 ms: the pictures traverse a filter 3 and the movement vectors are determined by a module 8 according to the method described above (cost function). The module 8 has to know the pictures in two successive time periods, which pictures are supplied to it simultaneously by the outputs of two delay circuits 13 arranged in cascade, which each cause a delay of 20 ms. The filtered picture with its movement vectors is supplied to a module 9, which calculates the value of the aforementioned cost function by comparison with the source picture 1, which is also supplied to it through a delay circuit 14, whose delay is equal to that caused by the circuits 3 and 8.

The path shown in the lower part of the Figure is intended for an encoding without estimation of movement vectors, in which a complete picture is described in 20 ms: the pictures traverse a filter 4 and are supplied to a module 6, which calculates the value of the aforementioned cost function by comparison with the source picture 1 supplied to it through a delay circuit 5, whose delay is equal to that caused by the filter 4.

The two cost functions calculated in the modules 6 and 9, respectively, are supplied to an evaluation module 10. As the delay caused by the elements 3, 8 is larger than that caused by the elements 4, 6, a supplementary delay circuit 7 is introduced between the modules 6 and 10 in order that the informations of the modules 6 and 9 arrive together at the module 10.

The module 10 determines which is the best path, i.e. the best mode of encoding, by choosing that of the two paths for which the cost function is most favorable. Alternatively, a priori also the path with movement vector may be chosen if the cost evaluated for this path is lower than a predetermined value (i.e. without influence being exerted by the cost calculated for the other path). Nevertheless several movement vectors can always be equivalent, so that a choice between them cannot be made. Therefore, the module 10 is followed by a module 11, in which a geometric distortion value is calculated, and by a module 19, in which a criterion on the basis this value permits of choosing the best movement vector.

If the mode with movement vector has been chosen, the movement vectors are supplied by the module 10 to the module 11. In order that the vectors of a picture can be compared with those of a preceding picture, the module 11 is provided with a feedback circuit with a delay of 40 ms, which "feeds back" to it the vectors of the preceding picture to be compared.

Figure 5:
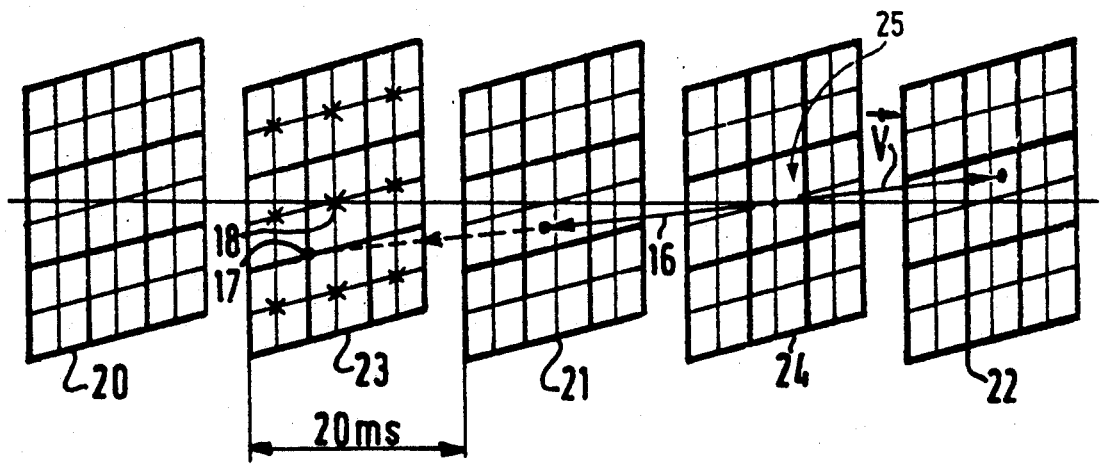
FIG. 5 shows groups of picture parts succeeding each other in time to illustrate the method according to the invention.

The process of comparison effected in the module 11 is illustrated in FIG. 5. The three pictures 20, 21, 22 are transmitted pictures and the pictures 23 and 24 are pictures to be created by means of the movement vectors. In the Figure, only a fraction of the picture containing nine picture parts is shown each time, which fraction will nevertheless be designated as picture in order to simplify the terminology. Let the validity of a movement vector of the picture 24 be verified, while the process is now terminated for the pictures 20, 21, 23.

For each movement vector to be tested, the picture part concerned is subjected to a displacement corresponding to a return back in time of 40 ms in the direction and at the speed indicated by the said movement vector, which brings the said picture part of the picture 24 to one of the parts of the picture 23. Let it be assumed that the movement vector indicated symbolically by the arrow 16 brings the central point of the picture 24 to the point 17 in the picture 23. This point is situated in the square 18, for which a movement vector had been determined in the picture 23. The distortion between this preceding vector and the current vector tested for the picture 24 is calculated and stored. Subsequently the operation is repeated for all the equivalent vectors for the current picture part of the picture 24.

If, for example, the movement vectors have amplitudes limited (for reasons of transmission flow rate) to 16 pixels according to each coordinate axis, the point 17 cannot be located outside the four squares of the centre of the Figure (each of them has a dimension of 16×16 pixels). For the assembly of the movement vectors to be tested for a picture part 24, there are at most four picture parts concerned in the picture 23, that is to say that the comparison process is simple and requires very little storage capacity.

The module 19, which follows the module 11, finally determines the movement vector which will be used. The modules 8 and 9 of FIG. 4 are provided with processor means for determining, as the case may be, several equivalent movement vectors and for calculating for each of them the cost function. These data are supplied to the module 19. The process in the module 19 is then as follows: it contains a register in which it draws up the list of the equivalent movement vectors for a picture part while classing them in order of merit decreasing from the viewpoint of the cost function calculated in the module 9. If an assembly of movement vectors exists, for which the comparison values supplied by the module 19 are themselves equivalent, that is to say that the distortions are all lower than a predetermined value, the movement vector chosen is that which among the elements of this assembly is closest to the beginning of the list. If, for example, the assembly contains only one movement vector, this vector will be chosen, even if it is not at the beginning of the list. If on the contrary not a single comparison value is suitable, this is due to the fact that the movement has not been regular between the two compared pictures and that therefore the method is not adapted, and the movement vector at the beginning of the list is chosen.

The numerical examples given with reference to FIGS. 6 to 8 permit of understanding the invention even more clearly. The tables shown in these Figures give examples of cost values (indicated in the column "COST") and of values of the geometric difference (indicated in the column "DELTA") for five vectors designated by A, B, C, D, E, which numerical values need not be considered as real values, but as values chosen for the best possible explanation. As indicated above, the vectors A to E are classed in order of merit decreasing from the viewpoint of cost function.

These vectors are considered as equivalent when the values associated with them lie in a given range, here, for example, when the values of cost of geometric difference are lower than or equal to a threshold value equal to 10, which can be read immediately in the tables of the Figures. For example, in FIG. 6, it is found that, when the cost function is considered, the vectors A, B, C, D are equivalent (and likewise in FIGS. 7 and 8 in the examples chosen), and that, when the geometric difference is considered, the vectors A, D, E (C, D, E in the case of FIG. 7; no vector in the case of FIG. 8) are equivalent and form the said assembly of movement vectors mentioned above. In this assembly of three movement vectors A, D, E, the movement vector finally chosen is that for which the calculated difference is smallest.

Likewise, in the case of FIG. 7, among the three preselected vectors C, D, E, the vector finally chosen is the vector C, that for which the cost function has the most favorable value, i.e. the lowest value. Finally, in the case of FIG. 8, no movement vector exists for which the geometric difference is smaller than the threshold value of 10 and therefore as vector that vector is chosen for which the cost function is most favorable, i.e. the vector A.

We claim:

1. A method of processing pictures, in which the picture is divided into several parts and each picture part is examined for determining thereof—in the presence of a series of pictures succeeding each other in time—a movement vector, said method comprising the steps of: determining a movement vector being susceptible to supplying for the same picture part several movement vectors all suitable and designated as equivalent movement vectors, calculating for each equivalent movement vector the position in which the picture part concerned would be located in a preceding picture if said movement vector should be applied to this picture part, each time calculating the difference between the movement vector used to arrive at said position and the movement vector which had been determined for this position in the preceding picture, and choosing the movement vector as a function of the result of said difference calculation.

2. A method of processing pictures as claimed in claim 1, utilizing a method of determining movement vectors based on the calculation of a function expressing the validity of a movement vector, characterized in that if several equivalent movement vectors exist, for which said difference is smaller than a predetermined threshold value, the equivalent vector is chosen among them for which said function has the most favorable value.

3. A method of processing pictures as claimed in claim 1, utilizing a method of determining movement vectors based on the calculation of a function expressing the validity of a movement vector, characterized in that if not a single equivalent movement vector exists, for which said difference is smaller than a predetermined threshold value, among the equivalent vectors that vector is chosen for which said function has the most favorable value.

4. A device for processing pictures comprising a processor for determining—in the presence of a series of pictures succeeding each other in time—movement vectors associated with picture parts, said processor comprising: means for supplying for the same picture part several equivalent movement vectors, means for calculating for each equivalent movement vector the position in which the picture part concerned would be located in a preceding picture if said movement vector should be applied to this picture part, means for calculating each time the difference between the movement vector used to arrive at said position and the movement vector which had been determined for this position in the preceding picture, and means for selecting at least one movement vector from this calculated difference.

5. A device of processing pictures as claimed in claim 4, further comprising means for calculating a cost function in order to decide whether each of said movement vectors is acceptable, means for choosing, if several equivalent movement vectors exist for which the aforementioned difference is smaller than a predetermined threshold value, among them that for which the cost function has the most favorable value.

6. A device for processing pictures as claimed in claim 4, further comprising means for calculating a cost function in order to decide whether each of said movement vectors is acceptable, and means for choosing, if not a single equivalent movement vector exists for which the aforementioned difference is smaller than a predetermined threshold value, the equivalent movement vector for which the cost function has the most favorable value.

7. A high definition television encoding system comprising a device as claimed in claim 4.

8. A method of processing pictures as claimed in claim 2, utilizing a method of determining movement vectors based on the calculation of a function expressing the validity of a movement vector, characterized in that if not a single equivalent movement vector exists, for which said difference is smaller than a predetermined threshold value, among the equivalent vectors that vector is chosen for which said function has the most favorable value.

9. A device for processing pictures as claimed in claim 5, further comprising means for calculating a cost function in order to decide whether each of said movement vectors is acceptable, and means for choosing, if not a single equivalent movement vector exists for which the aforementioned difference is smaller than a predetermined threshold value, the equivalent movement vector for which the cost function has the most favorable value.

10. A high definition television encoding system comprising a device as claimed in claim 5.

11. A high definition television encoding system comprising a device as claimed in claim 6.

12. A high definition television encoding system comprising a device as claimed in claim 9.

13. A method for selecting a preferred movement vector for a first picture part of a first picture of a plurality of pictures each comprising a plurality of picture parts having an associated movement vector, said method comprising the steps of:
calculating for said first picture part, a plurality of equivalent movement vectors;
identifying for each said equivalent movement vector, a respective candidate position in a preceding picture at which said first picture part would be located should the respective equivalent movement vector be applied to said first picture part;
calculating the differences between each equivalent movement vector and each associated movement vector associated with a respective candidate position; and
selecting a preferred movement vector from among said equivalent movement vectors as a function of said differences.

14. A method as described in claim 13 wherein said equivalent movement vectors are selected from a plurality of associated movement vectors calculated as a function of their respective validity, and wherein if said differences are smaller than a predetermined threshold, the equivalent movement vector having the most favorable value of validity function is selected as said preferred movement vector.

15. A method as described in claim 13 wherein said equivalent movement vectors are selected from a plurality of associated movement vectors calculated as a function of their respective validity, and wherein if none of said differences are smaller than a predetermined threshold, the equivalent movement vector having the most favorable value of validity function is selected as said preferred movement vector.

16. An apparatus for selecting a preferred movement vector for a first picture part of a first picture of a plurality of pictures each comprising a plurality of picture parts having an associated movement vector, said apparatus comprising:
a) means for calculating for said first picture part, a plurality of equivalent movement vectors;
b) means for identifying for each said equivalent movement vector, a respective candidate position in a preceding picture at which said first picture part would be located should the respective equivalent movement vector be applied to said first picture part;
c) means for calculating the differences between each equivalent movement vector and each associated movement vector associated with a respective candidate position; and
d) means for selecting a preferred movement vector from among said equivalent movement vectors as a function of said differences.

17. The apparatus as described in claim 16 wherein said equivalent movement vectors are selected from a plurality of associated movement vectors as a function of their cost, and further comprising means for selecting, if said differences are smaller than a predetermined threshold, the equivalent movement vector having the most favorable value of cost function, as said preferred movement vector.

18. The apparatus as described in claim 16 wherein said equivalent movement vectors are selected from a plurality of associated movement vectors as a function of their cost, and further comprising means for selecting, if none of said differences are smaller than a predetermined threshold, the equivalent movement vector having the most favorable value of cost function, as said preferred movement vector.

* * * * *